(12) United States Patent
Thomas et al.

(10) Patent No.: US 9,120,446 B2
(45) Date of Patent: Sep. 1, 2015

(54) WHEEL LOCKING SYSTEM

(71) Applicants: William Eugene Thomas, Cypress, TX (US); Paul B. Hvass, San Antonio, TX (US); Nicholas A. Herrera, San Antonio, TX (US); Terrence M. Tomlinson, Pipe Creek, TX (US); Cliff J. Scribner, San Antonio, TX (US); Rogers E. Rimmer, San Antonio, TX (US); Nakul Jeirath, San Antonio, TX (US); Edward G. Alvarado, Jr., San Antonio, TX (US)

(72) Inventors: William Eugene Thomas, Cypress, TX (US); Paul B. Hvass, San Antonio, TX (US); Nicholas A. Herrera, San Antonio, TX (US); Terrence M. Tomlinson, Pipe Creek, TX (US); Cliff J. Scribner, San Antonio, TX (US); Rogers E. Rimmer, San Antonio, TX (US); Nakul Jeirath, San Antonio, TX (US); Edward G. Alvarado, Jr., San Antonio, TX (US)

(73) Assignee: Combination Wheels, LLC, Cypress, TX (US)

( * ) Notice: Subject to any disclaimer, the term of this patent is extended or adjusted under 35 U.S.C. 154(b) by 44 days.

(21) Appl. No.: 13/711,617

(22) Filed: Dec. 12, 2012

(65) Prior Publication Data

US 2014/0157841 A1 Jun. 12, 2014

(51) Int. Cl.
*B60R 25/00* (2013.01)
*B60B 3/14* (2006.01)
*B60B 3/16* (2006.01)
*B60B 7/00* (2006.01)

(52) U.S. Cl.
CPC . *B60R 25/00* (2013.01); *B60B 3/14* (2013.01); *B60B 3/165* (2013.01); *B60B 7/0013* (2013.01); *B60B 2900/3318* (2013.01); *B60Y 2200/10* (2013.01); *Y10T 70/5889* (2015.04)

(58) Field of Classification Search
CPC ...... B60R 25/00; B60R 25/09; B60R 25/093; E05B 77/44; E05B 81/00; E05B 81/02; E05B 81/04; E05B 81/06
USPC ........... 70/225–227, 258–260, 166, 232, 275, 70/277, 278.1, 278.7; 301/35.624, 37.21
See application file for complete search history.

(56) References Cited

U.S. PATENT DOCUMENTS

| | | | | | |
|---|---|---|---|---|---|
| 2,124,035 | A | * | 7/1938 | Hurd | 70/259 |
| 2,340,998 | A | * | 2/1944 | Sundell | 70/259 |
| 2,568,370 | A | * | 9/1951 | Scuderi | 70/225 |
| 3,995,461 | A | * | 12/1976 | Hudson | 70/259 |
| 4,161,869 | A | * | 7/1979 | Dixon | 70/259 |
| 4,498,614 | A | * | 2/1985 | Guarr | 70/259 |
| 4,631,936 | A | * | 12/1986 | Minami | 70/167 |
| 4,703,636 | A | * | 11/1987 | Minami | 70/229 |
| 4,819,462 | A | * | 4/1989 | Apsell | 70/232 |
| 5,934,118 | A | * | 8/1999 | Henness | 70/232 |
| 6,045,195 | A | * | 4/2000 | Okamoto | 301/37.376 |
| 6,419,326 | B1 | * | 7/2002 | Rains | 70/225 |
| 6,494,473 | B1 | * | 12/2002 | Baghboian | 70/226 |
| 6,932,436 | B2 | * | 8/2005 | Chae | 70/225 |
| 7,673,482 | B2 | * | 3/2010 | Bosman | 70/260 |
| 7,768,378 | B2 | * | 8/2010 | Hill et al. | 70/106 |
| 7,950,570 | B2 | * | 5/2011 | Marchasin et al. | 70/226 |
| 7,988,046 | B2 | * | 8/2011 | Moynihan et al. | 70/226 |
| 8,739,585 | B2 | * | 6/2014 | Sims | 70/225 |
| 8,943,865 | B1 | * | 2/2015 | Bullock et al. | 70/225 |
| 2008/0127691 | A1 | * | 6/2008 | Castillo et al. | 70/225 |

\* cited by examiner

*Primary Examiner* — Christopher Boswell

(57) ABSTRACT

One or more embodiments of a combination wheel locking system are provided herein. The combination wheel locking system can be used to prevent access to one or more lug nuts on a wheel. The combination wheel locking system and anti-theft device can include a combination master lock system for operatively engaging and releasing from a portion of a wheel.

9 Claims, 11 Drawing Sheets

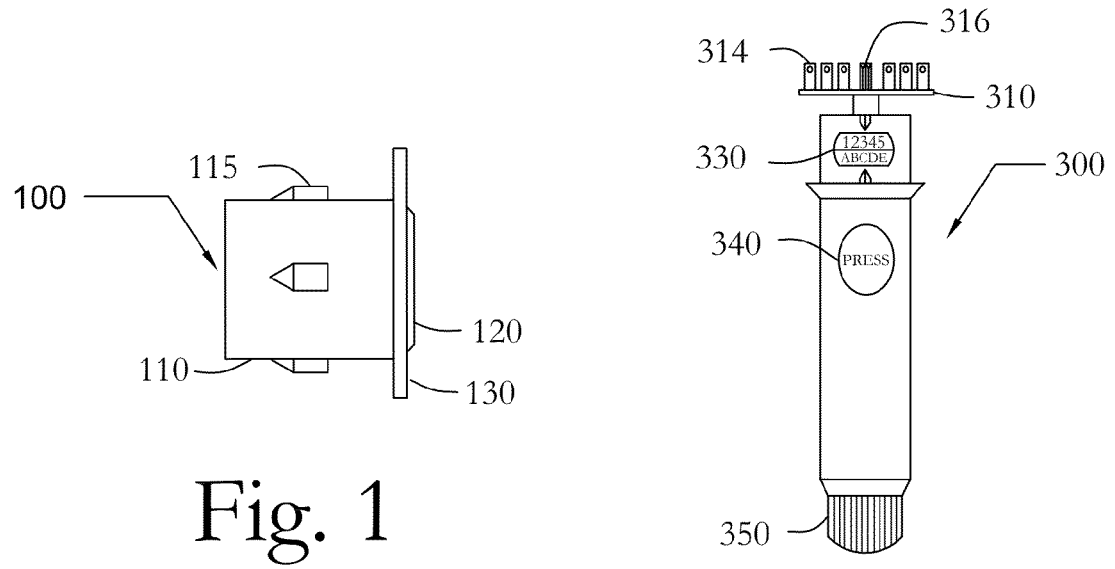
Fig. 1
Fig. 3
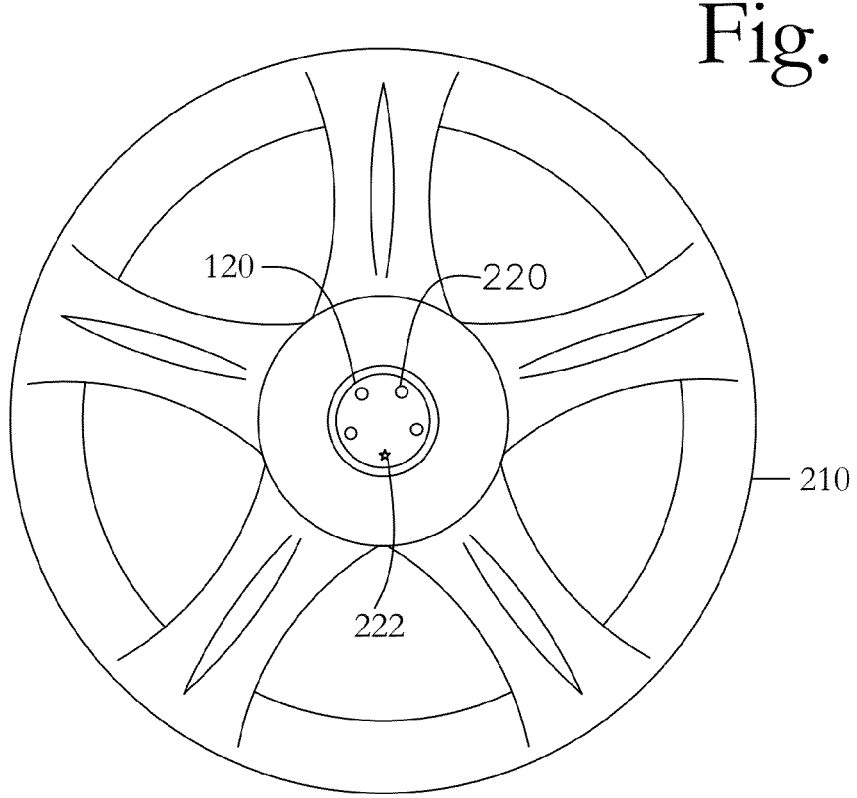
Fig. 2

WHEEL LOCKING SYSTEM

FIELD

The present embodiments generally relate to a wheel locking system for preventing access to one or more lug nuts on a wheel.

BACKGROUND

A need exists for a wheel locking system and an anti-theft device which prevents the theft of wheels, tires and/or rims of a vehicle.

The conventional anti-theft devices commonly used on wheels to prevent theft are security keyed lug nuts that secure to the wheels of a vehicle. The lug nuts can be screwed on or off using a special designed barreled cut key.

Furthermore, there are many different types of wheels, some which have an exposed lug nut design and others can be designed with a circular center cap that fits in the center of the wheel to cover the lug nuts.

These lug nuts and center caps are usually not designed for security purposes and can easily be tampered with and/or removed.

The present system enables a user prevent the removal of lug nuts from wheels on vehicles thereby preventing the theft of the wheels.

The present embodiments meet these needs.

BRIEF DESCRIPTION OF THE DRAWINGS

The detailed description will be better understood in conjunction with the accompanying drawings as follows:

FIG. 1 is a combination locking system according to one or more embodiments.

FIG. 2 is the combination locking system of FIG. 1 shown on a wheel according to one or more embodiments.

FIG. 3 is a reconfigurable tool for removing a combination locking system from a wheel according to one or more embodiments.

Figure 4:
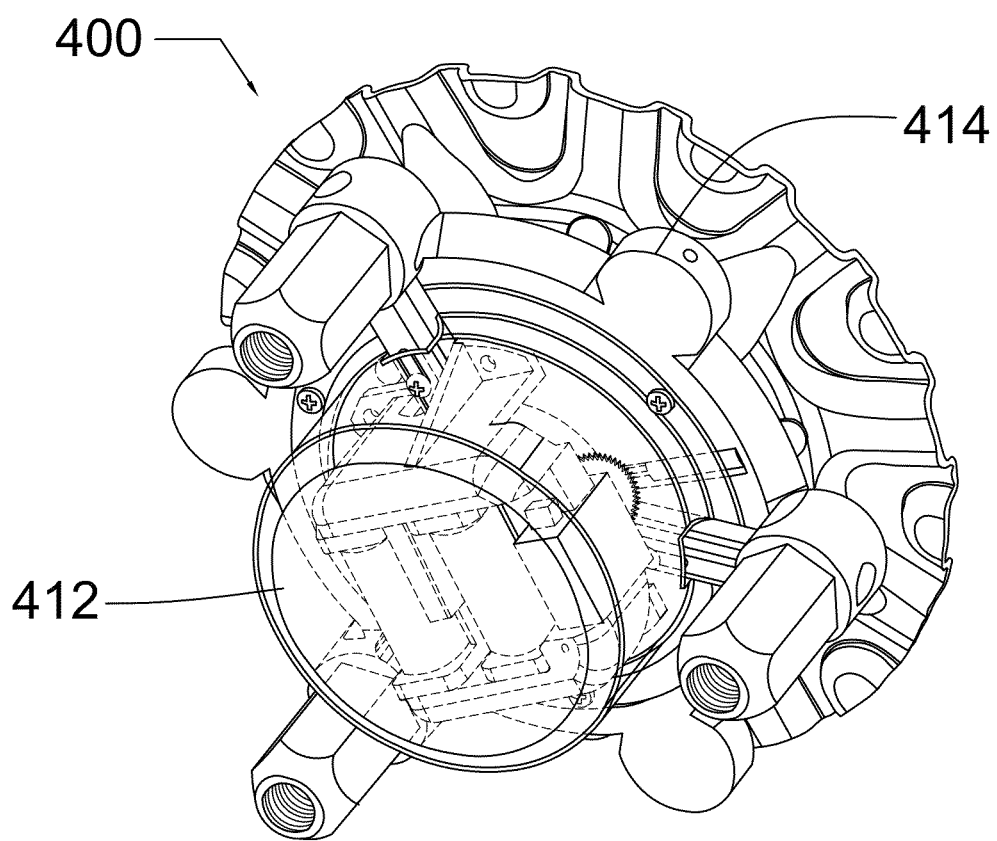
FIG. 4 depicts a bottom view of a remotely operated locking system.

The present embodiments are detailed below with reference to the listed Figures.

DETAILED DESCRIPTION OF THE EMBODIMENTS

Before explaining the present apparatus and system in detail, it is to be understood that the apparatus and system are not limited to the particular embodiments and that it can be practiced or carried out in various ways.

The present embodiments generally relate to a combination wheel locking system and/or anti-theft device for preventing access to one or more lug nuts on a wheel. The system further includes a combination wheel locking system for vehicles to prevent theft of wheels, tires and rims.

The combination wheel locking system can also include an alpha-numeric code that can be registered upon purchase. This can allow tracking of a combination wheel locking system and anti-theft device that is stolen and allow a secondary layer of protection to the system.

The combination locking system can include a master cylinder, one or more locking pins, and a center cap.

The center cap can have edges, such a flanges, fingers, protrusions, or the like, that fit under the rim, such as a center cap cavity, with a minimum gap. To resist prying, the center cap can be a flat surface, with no undercuts to pry up. The center cap can have a hard, low friction, tough surface. The center cap can be or have a stiff cover.

A Sorbethane layer can be laminated between the center cap and the lock to dampen shock due to pounding or other types of tampering.

To resist drilling, hardened tool steel disks can be sandwiched between the center cap and the locking mechanism. When the drill bit reaches a disk, the disk can begin to spin and prevent further progress.

The master cylinder can be made of steel, metal, or a similar material, which will not deform or break during impact.

The at least two locking pins, such as shear pins, steel pins, dowel pins, or the like, can be made of similar material. There can be additional locking pins in embodiments, such as up to four.

The center cap can be made of a similar material as the master cylinder or the locking pins. The center cap face top side can be angled upwards at approximately 45 degrees and the center cap face bottom side can be angled downwards at approximately 45 degrees to prevent the master cylinder from being pried from a wheel of a vehicle.

The center cap can further turn clockwise and counter clockwise.

The master cylinder lines up with the locking pins, which line up with grooves engraved on the wheel or tire. The grooves can be premade at the time of manufacture.

The tool assembly can be used with the combination locking system. The tool assembly can be a "T" shaped assembly, which can have a handle and a face plate adjacent to the handle.

The tool assembly can be protected with a unique number or letter combination, which can be stored on a combination dial. The combination dial, which can be any commercially available combination dial, can be operatively aligned with the master cylinder and cause the locking pins to move from a locked position to a unlocked position upon the correct code being entered using the combination dial. The number combination can include the numbers from one to twenty-six, which can further represent a letter combination from A to Z.

The tool assembly can include a lock and release button. The lock and release button is used for securing the tool in place into the center cap combination dial.

The combination knob, which can be located on the bottom of the tool, can turn 360 degrees clockwise and counterclockwise and can turn the combination to release the locking pins from the grooves in the wheel.

The face plate can have a star alignment pin.

The tool can further have a flashlight. The flashlight can be configured to illuminate one or more portions of a wheel, the combination master lock system, or combinations thereof as the tool is being operatively engaged with the combination master lock system.

Turning now to the Figures, FIG. 1 is a combination master lock system according to one or more embodiments. The combination master lock system 100 can include a master cylinder 110, one or more locking pins 115, one or more center caps 120, and one or more steel center caps 130.

The center cap 120 can be configured to operatively engaged and turned to enter a code or combination into the master cylinder 110 causing the locking pins 115 to move from a locked position to an unlocked position. The master cylinder can be similar to a commercially available locking device, which would be obvious to one skilled in the art with the aid of this disclosure. And the center cap 120 can function similar to a dial on a commercially available combination lock, which would be obvious to one skilled in the art with the aid of this disclosure.

The center cap 120 can be operatively disposed within the steel center cap 130. The steel center cap 130 can be fixed relative to the master cylinder 110, and can protect or cover lug nuts. The lug nuts can be securing a wheel to a vehicle.

The locking pins 115 can be similar to locking pins on commercially available locks.

FIG. 2 depicts the combination master lock system 100 operatively engaged with a wheel 210. The combination master lock system 100 can be disposed in the center of the wheel 210. The center cap 120 can have one or more alignment holes 222 configured to receive a star alignment pin of a tool, which is depicted in FIG. 3. The center cap 120 can also include one or more release holes 220, which can receive lock and release pins of the tool also depicted in FIG. 3.

FIG. 3 depicts an embodiment of the tool according to one or more embodiments. The tool 300 can include a head 310, a lock and release button 340, a combination dial 330, and a combination knob 350.

The head 310 can include a plurality of lock and release pins 314. The lock and release pins can be cipher pins. The lock and release pins can include one or more devices configured to opertavily engage the release holes, allowing the tool 300 to turn the master cylinder to release the locking pins, and to also allow the tool 300 to remove the combination master locking system to expose one or more lug nuts connecting the wheels to a vehicle.

The star alignment pin 316 can be used to ensure the tool is properly aligned with the combination master locking system.

The combination dial 330 can indicate the combination being relayed to the master cylinder. The combination dial 330 can include an alpha or other symbol and numeric or other code associated with the alpha code. Allowing for redundancy and accuracy if the code has to be read to a person at a remote location. For example, if the vehicle is taken to a mechanic and the mechanic needs the combination to remove the wheel, the owner of the vehicle can either state the alpha code "ABC", which can be associated with "123" as such if the mechanic can't understand "ABC" the owner can say "123".

The tool 300 can also include a lock and release button 340. The lock and release button 340 can release a lock mechanism on the lock and release pins 314, allowing the lock and release pins 314 to be inserted into the release holes and removed from the release holes when actuated. For example, the lock and release pins 314 can have ball bearings that can move in or out when the lock and release button 340 is actuated, allowing the lock and release pins 314 to be inserted in the lock holes and the lock holes can have a notch, groove, or the like configured to secure to the ball upon the lock and release button being released. As such, the release holes can be selectively secured to the lock and release pins 314.

The combination knob 350 can be used to turn the master cylinder. The combination knob 350 can turn 360 degrees counter clockwise or 360 degrees clockwise.

FIG. 4 depicts a bottom view of a remotely operated locking system.

The remotely operated locking system 400 can include a lock plate 414 and a lock housing 412. The lock housing 412 can contain one or more components of the locking system. The lock housing 412 can secure with the lock plate 414, with fasteners.

Figure 5:
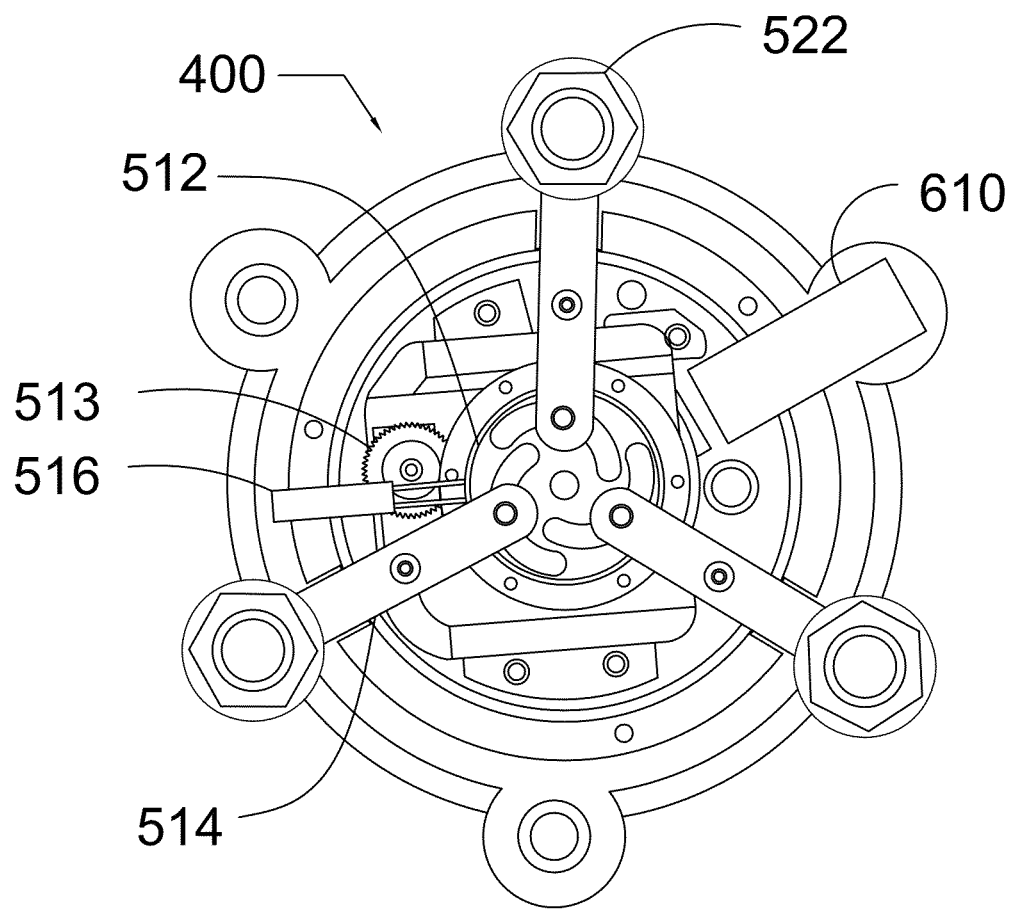
FIG. 5 a top view schematic of the remotely operated locking system installed with a wheel with the lock plate, cover removed exposing the internal components of the locking system.

FIG. 5 a top view schematic of the remotely operated locking system installed with a wheel with the lock plate cover removed exposing the internal components of the locking system.

The remotely operated system 400 can be placed in a wheel.

The remotely operated system can include one or more locking pins 514 that are configured to engage one or more lug nuts 522 with one or more grooves formed therein.

The locking pins 514 are depicted in a locking engagement with the lug nuts 522. The locking pins 514 can be connected with a scroll 510. One or more spur gears 513 can turn the scroll when an actuation signal is received by the remotely operated locking system 400. The scroll 510 can be moved to disengage the locking pins 514 from the lug nuts 522.

A magnetic reed switch 516 can be connected with the system. The magnetic reed switch 516 can sense when the center cap is in place over the wheel. As such, when the remotely operated locking system is removed from the wheel, the power can be turned off to conserve battery.

A remote module 610. The remote module 610 can display the status of communication. The remote module 610 can be configured to communicate with a remote device. The remote module 610 can be a wireless module having a wireless technology standard for exchanging data over short distances, e.g., a BLUETOOTH™ module, a Zigbee module, an IEEE 802.11 (Wireless Ethernet) module, a GSM (Cellular) module, 900 MHz (Remote Control) module, or the like.

Figure 6:
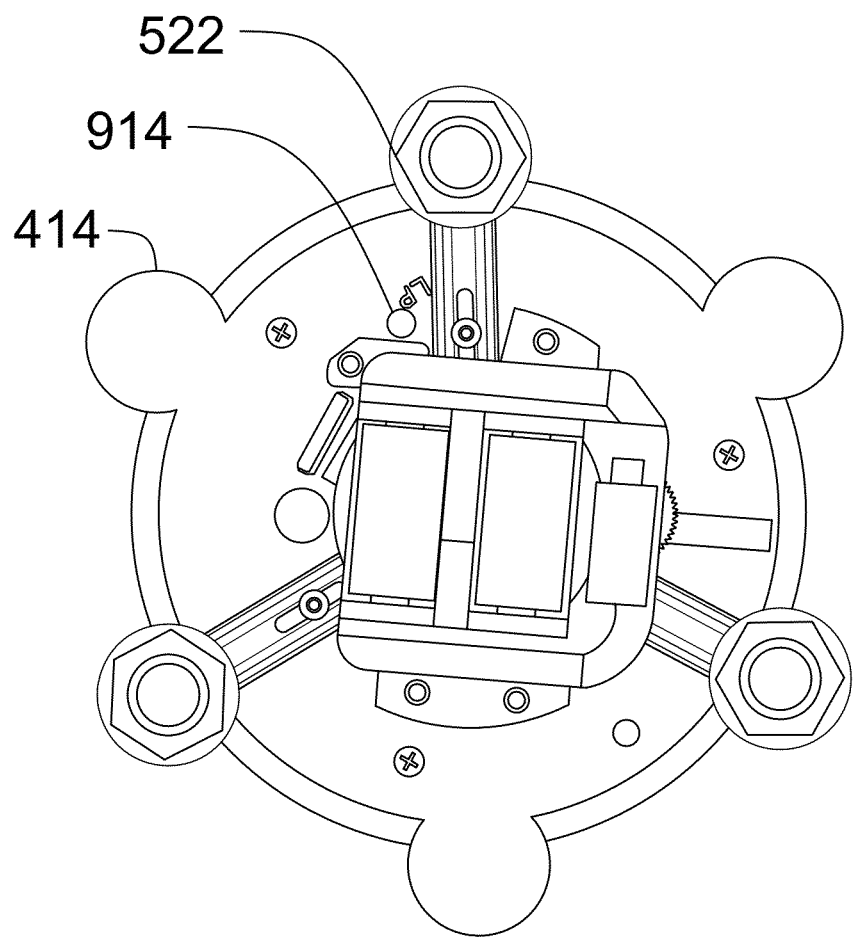
FIG. 6 depicts a bottom view of the lock plate connected with the locking system disposed in the wheel of FIG. 5, with the lock housing removed.

FIG. 6 depicts a bottom view of the lock plate connected with the locking system disposed in the wheel of FIG. 5.

The lock plate 414 can cover the lug nuts 522.

The locking plate 414 can have a veneer, which is not depicted.

Figure 7:
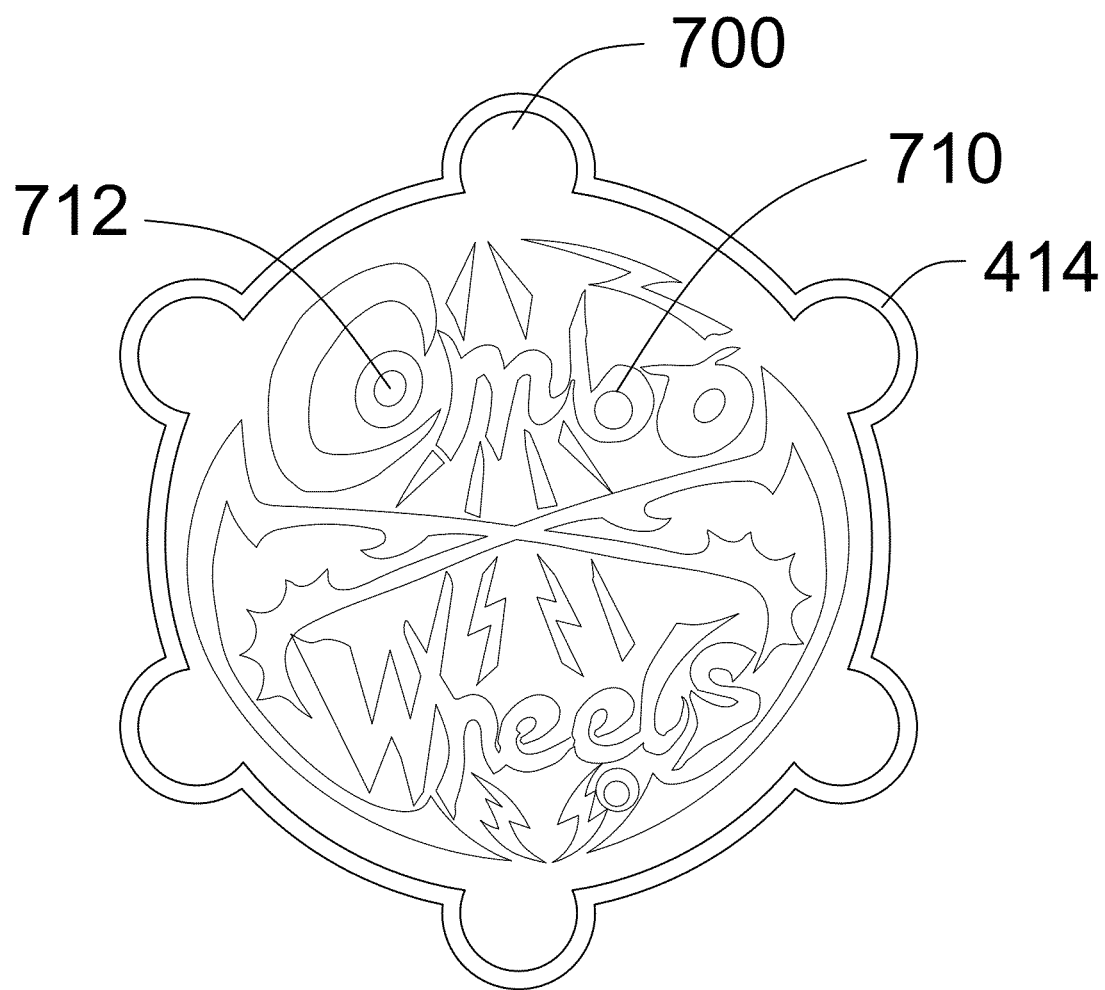
FIG. 7 depicts a decorative cover that can be secured to the locking plate.

FIG. 7 depicts a decorative cover that can be secured to the locking plate.

The decorative cover 700 can include a back-up power jack port 710.

The decorative cover 700 can fit within the lock plate. The lock plate 414 can cover the lug nuts.

The decorative cover 700 can include an indication module hole 712 aligned with the light pole.

The light pole can be configured to display a first color or pattern during boot up, a second color or pattern when the communication device is ready to communicate but is not connected, a third color or pattern when a connection is established with the communication device. For example, the first color or pattern can be a flashing red light, the second color or pattern can be a solid red light, the third color or pattern can be a solid blue light. The light pole can be controlled by a micro-control unit described in more detail below.

A graphic or logo can be placed on the decorative cover.

Figure 8:
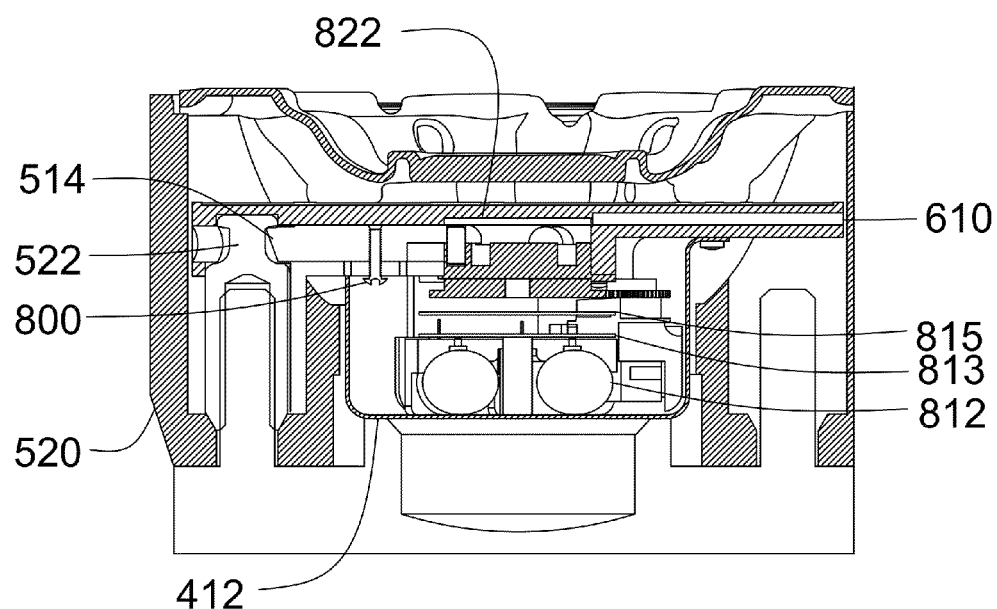
FIG. 8 depicts a schematic of a side view of the internal components of the remotely operated locking system installed in the wheel.

FIG. 8 depicts a schematic of a side view of the internal components of the remotely operated locking system installed in the wheel.

The remotely operated locking system can include a power system 812. The power system 812 can include one or more batteries, capacitors, or combinations thereof.

The power system 812 can be in communication with a power conditioning board 813. The power conditioning board 813 can include software configured to regulate and balance the power system 812.

The power system, the power conditioning board 813, or both can be in communication with a micro-controller 815.

The micro-control module 815 can be configured to receive signals from and send signals to the remote module. The micro-control module 815 can have software to actuate a motor to move the locking pins 514 when a signal is received from the remote module and to send data to a remote device on the status of the lock, i.e., is the wheel unlocked or locked. The micro-control module 815 can also acquire data on the power level of a power source for the lock system from the power conditioning board 813.

The power system 812, the power conditioning board 813, and the micro-control module 815 can all be housed in the lock housing 412 to protect them dust and water ingress.

The locking pins 514 are engaged with the grooved lug nuts 522 of the wheel 520.

Guide pins 800 can be engaged with the locking pins 514. The guide pins can guide the locking pins 514 as they move to ensure they travel in their path and do not twist.

An anti-hole saw plate 822 is depicted. The anti-hole saw plate 822 can be located in the lock plate.

The remote module 610 and micro-control module 815 can be stored in the lock housing 412.

Figure 9:
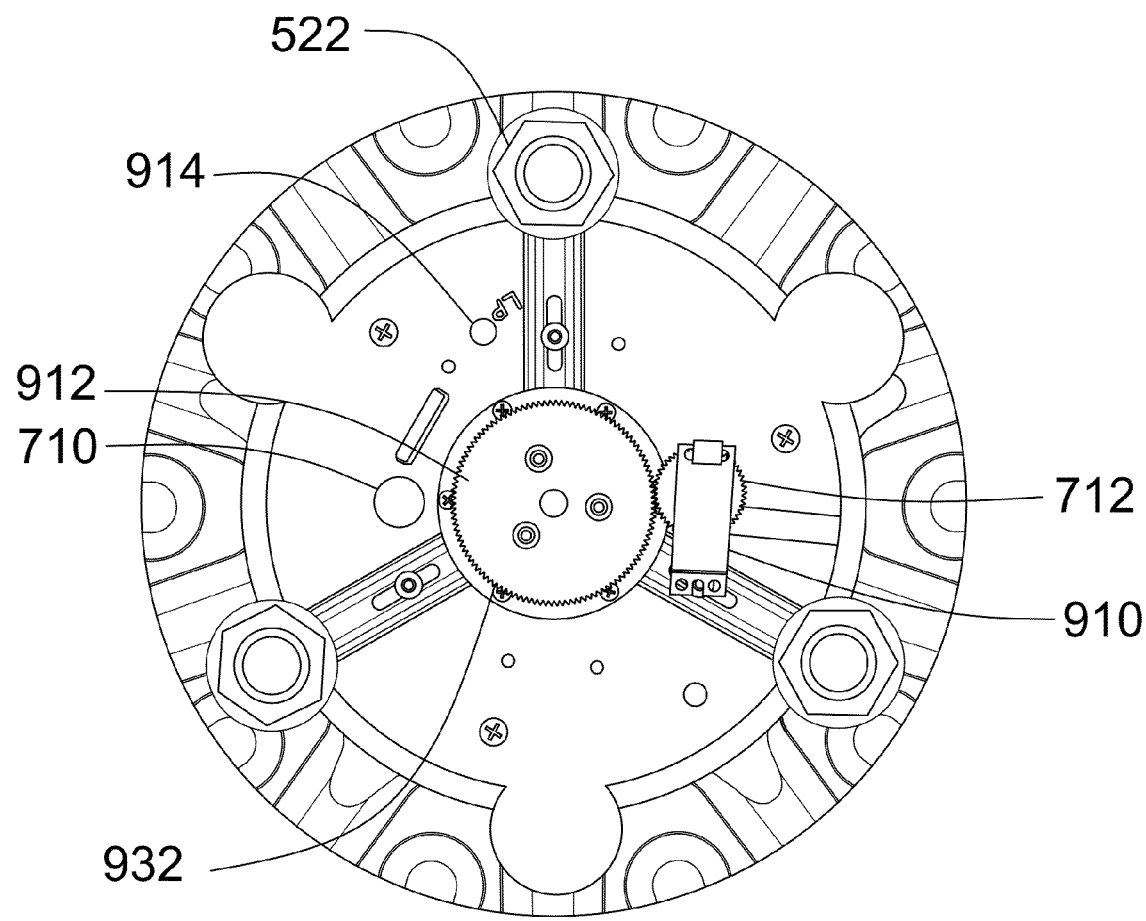
FIG. 9 depicts a schematic of a bottom view of a drive assembly of the remotely operated locking system.
Figure 10:
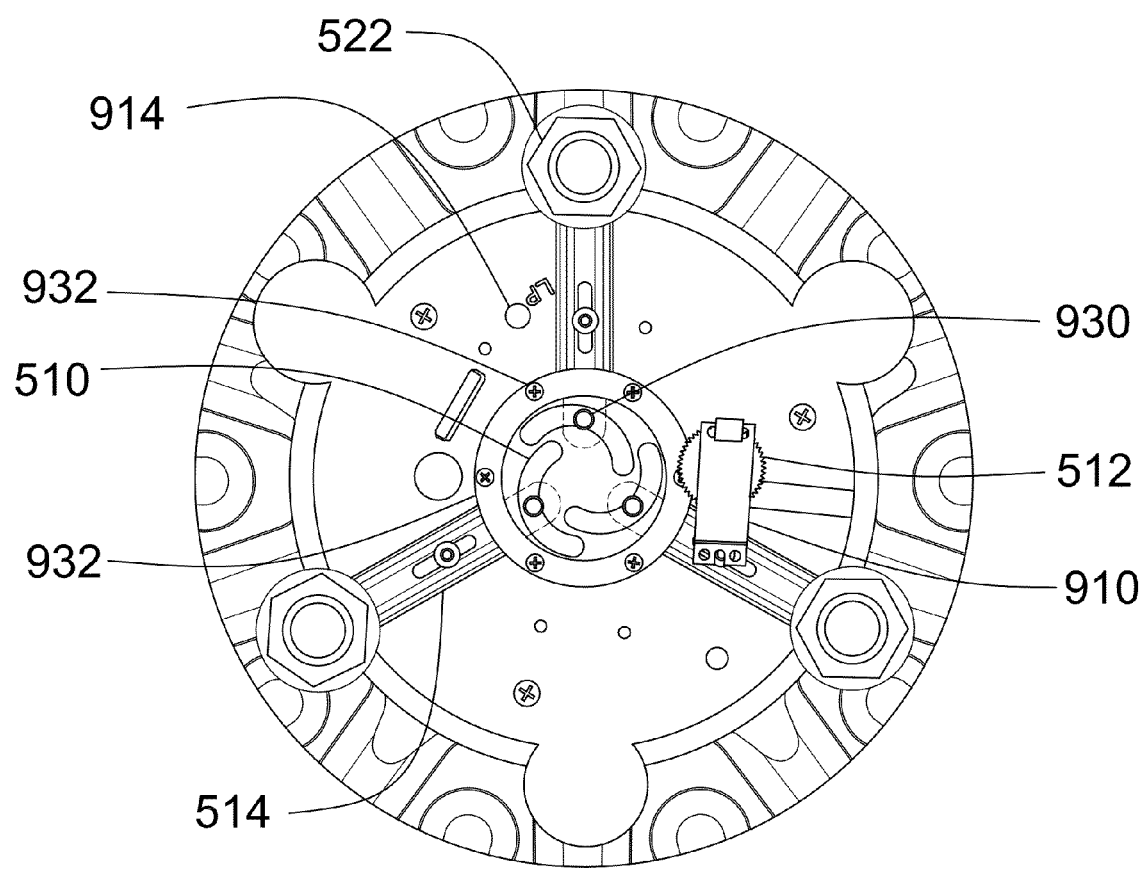
FIG. 10 depicts a bottom view schematic of a scroll assembly that is driven by the drive assembly.

FIG. 9 depicts a schematic of a bottom view of a drive assembly of the remotely operated locking system. FIG. 10 depicts a bottom view schematic of a scroll assembly that is driven by the drive assembly.

The drive assembly can include the spur gear. The spur gear can be operatively aligned with a servo motor 910. The servo motor 910 can be in communication with the micro-control module. The micro-control module can cause the servo motor 910 when a signal is received from the remote module.

The servo motor 910 can turn the spur gear 512; the spur gear 512 can turn a sun gear 912.

The sun gear 912 can turn the scroll 510.

The scroll 510 can turn within a scroll retainer 932. The follower pins 930 can be placed through slits in the scroll 510. The follower pins 930 can connect with locking pins 514 with the scroll 510. As the scroll 510 rotates the locking pins 514 can be engaged or disengaged with the lug nuts 522.

A light pipe hole 914 is also depicted. A light pipe can run through the hole to the indication module hole, which is depicted in FIG. 7.

A power jack, which can be a 12 volt power jack, can be in communication with the back-up power jack port 710. The back-up power jack is shown in FIG. 7.

Figure 11:
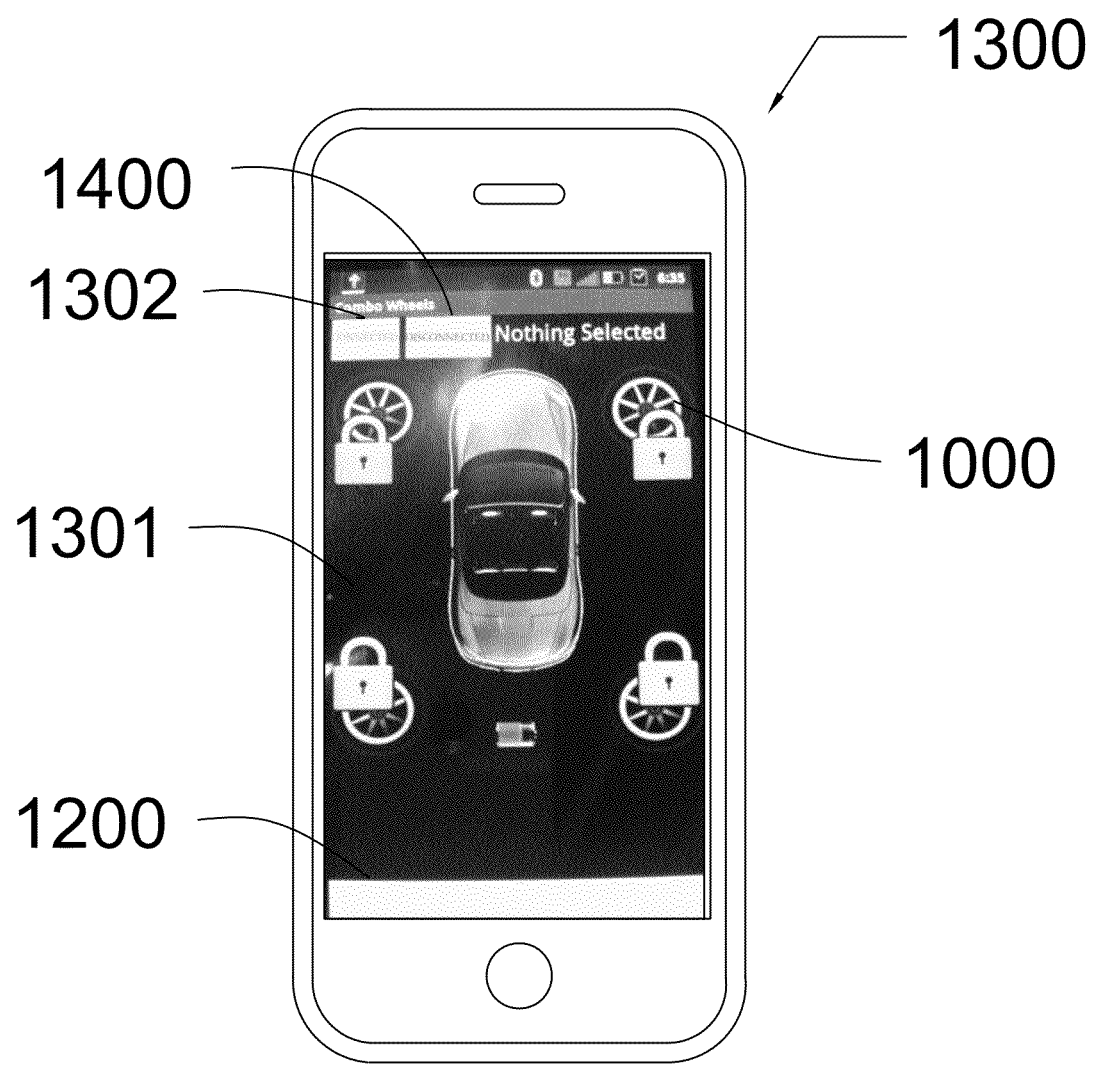
FIG. 11 depicts a display screen of a remote device configured to communicate with a remote module of the remotely operated locking system.

FIG. 11 depicts a display screen of a remote device configured to communicate with a remote module of the remotely operated locking system.

The display can be formed by one or more computer instruction sent to the remote device 1300. The computer instructions can be provided as phone application.

The display 1301 can include a connection indicator 1302. The connection indicator 1302 can be pushed to instruct the remote device to communicate with the remote module.

A disconnect indicator 1400 can also be located on the display. The disconnect indicator 1400 can be pushed to disconnect the remote device from the remote module.

One or more wheel status indicators 1000 can also be presented on the display. The wheel status indicators 1000 can indicate the status of each wheel of a vehicle. For example, a graphic of a car be presented and graphics of wheels can be positioned about the car, i.e, driver's side front, driver's side back, passenger's side front, passenger's side back, and an open lock or closed lock can be depicted with each wheel identifying the status of each wheel.

The wheel status indicator can be selected, for example by touching it, and a lock or unlock command can be issued for the selected indicator 1000. For example, a passenger side indicator can be selected and an unlock command button 1200 can be pushed to unlock the wheel, after the passenger side wheel is unlocked, wheel status indicator 1000 can indicate the wheel is unlocked.

The software on the remote device can include:

Computer instructions to identify and communicate with an appropriate remote module;

Computer instructions to allow a user to instruct the remote device to communicate with a remote module of a selected wheel;

Computer instructions to allow a user to issue a lock command, unlock command, or both to a selected wheel;

Computer instructions to indicate the power of one or more power sources of the lock system;

Computer instructions to allow a user to set a password;

Computer instructions to issue an email if a password is entered incorrectly a set number of times; and Computer instructions to allow a person to reset a password.

Figure 12:
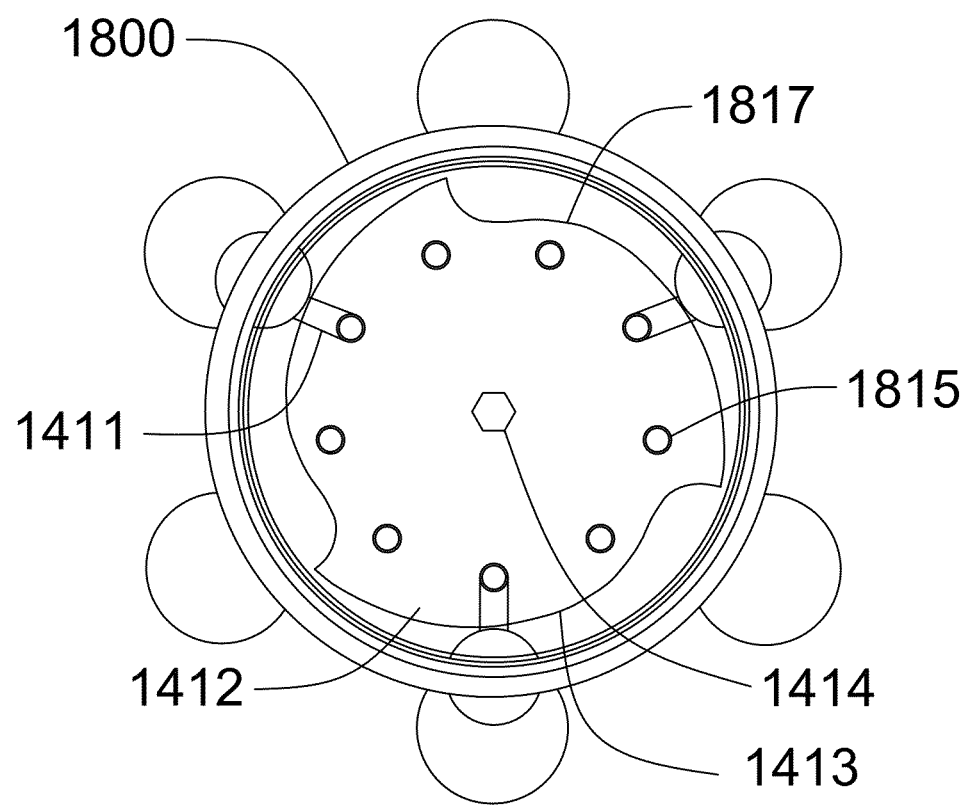
FIG. 12 depicts a magnet lock system.
Figure 13:
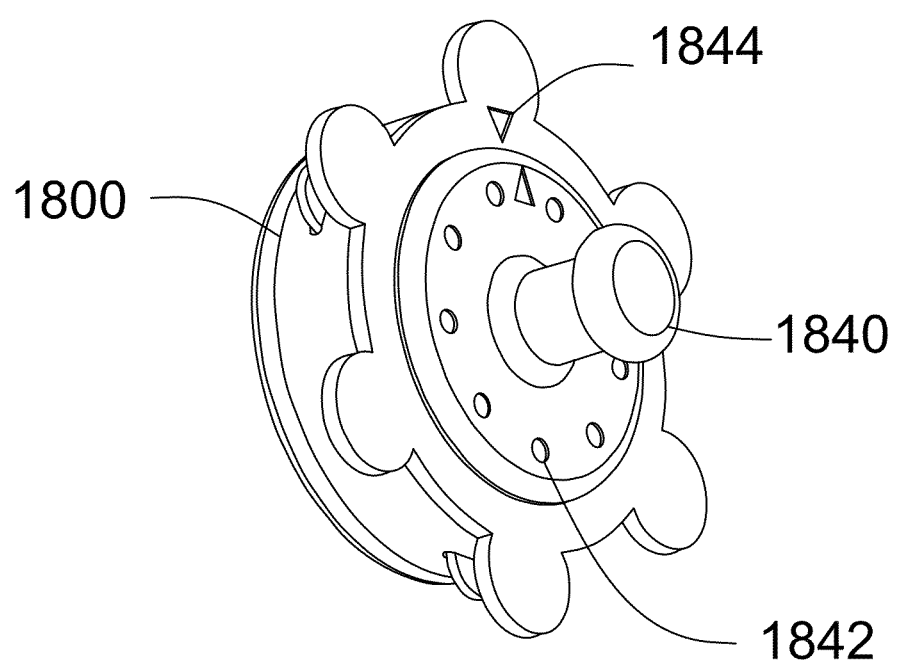
FIG. 13 depicts a key of a magnet lock system disposed on a locking plate cap.

FIG. 12 depicts a cap of a magnet lock system. FIG. 13 depicts a key of a magnet lock system disposed in the cap.

Referring to FIGS. 12 and 13, the magnet lock system can be a cylindrical lock system, plural magnetic lock system, or the like.

The cap 1800 can include be placed on a wheel to cover lug nuts of the wheel.

The cap 1800 can include a plate 1817. The plate can have one or more locking pins with magnets 1815.

The key 1840 can be engaged with the cap 1800. The key can have key magnets 1842. The key 1840 can be rotated to align the key magnets with the locking pins with magnets 1815. When the key magnets 1842 are properly aligned with the locking pins with magnets 1815 the plate 1817 can rotate releasing the cap from the wheel or providing access to the lug nuts.

The magnetic lock system can include cylindrical magnets bonded to steel locking pins that cross the shear line of a rotatable disk. A key hole can be formed in the cylindrical lock system 1414.

A key with magnetic elements to transfer torque from the key 1840 to the plate 1817 when properly set, can move the locking pins and cylindrical lock system to turn freely.

In one or more embodiments, interstitial magnets can enable transmission of torque so that a user can unlock the internal mechanism by twisting the key. To set a unique magnetic code, the user flips the magnetic cylinders (North or South facing) from the back side of the cylindrical lock system, when the lock is dismounted from a wheel.

The plural magnetic lock system can include a planetary gear housing. A set of magnetic elements can be disposed in the planetary gear housing. For example, there can be about 4 magnets per planet. The plural magnetic lock system can include a center cap.

A key can have a geared planetary arrangement with a hex hole cut in a center sun gear. In this case the combination is communicated via magnetic fields, but the mechanical torque to turn the lock is transmitted via a hex wrench protruding through a middle of both the key and the center cap. When a user turns the hex wrench, it not only turns the planets of the key, but also set of magnetic elements. The planetary motion is then transmitted to linear motion of rack-cut locking pins that engage grooves either in the rim or in the lug nuts. To change the code, individual magnetic cylinders housed in the planet gears can be flipped to any combination of north and south. To prevent tampering using large/strong external magnets, at least one north pole and one south pole should be set for each of the planets.

While these embodiments have been described with emphasis on the embodiments, it should be understood that within the scope of the appended claims, the embodiments might be practiced other than as specifically described herein.

What is claimed is:

1. A wheel locking system for preventing access to one or more lug nuts on a wheel, wherein the wheel locking system comprises at least one locking pin, and a lug nut configured to allow at least a portion of the at least one locking pin to be a least partially inserted therein, and a servo motor connected with a spur gear, wherein the spur gear is connected with a sun gear, and wherein the sun gear turns a scroll that is connected with the locking pin, and wherein the locking pin is moved by the scroll, and wherein at least one guide pin is connected with the locking to guide the movement of the locking pin.

2. The wheel locking system of claim 1, wherein the wheel locking system is a combination wheel locking system comprising: a combination master lock system for operatively engaging and releasing from a portion of a wheel, and a tool for operatively engaging the combination master lock system.

3. The combination wheel locking system of claim 1, wherein the locking system is a magnetic lock system.

4. A wheel locking system for preventing removal of one or more lug nuts on a wheel, wherein the wheel locking system comprises: a lock configured to operatively engage a wheel, wherein the lock comprises a locking pin and a servo motor connected with a spur gear, wherein the spur gear is connected with a sun gear, and wherein the sun gear turns a scroll that is connected with the locking pin, and wherein the locking pin is moved by the scroll, and wherein at least one guide pin is connected with the locking to guide the movement of the locking pin; a lug nut having a receptacle formed therein, wherein the receptacle is configured to selectively receive the locking pin when the locking pin is in a first position; and a remote device configured to acquire data on the locking system and remotely operate the servo motor, wherein the acquired data comprises an indication of the status of the locking pin.

5. The wheel locking system of claim 4, further comprising a cap configured to connect to an outer surface of the lock.

6. The wheel lock system of claim 5, further comprising a receiver and transceiver for sending signals to the remote device and receiving signals from the remote device.

7. The wheel lock system of claim 5, further comprising an indicator on the cap, wherein the indicator lights up to indicate connectivity with the remote device.

8. The wheel lock system of claim 5, wherein the remote device is configured to display the status of the lock.

9. The wheel lock system of claim 5, wherein the remote device is a smart phone, a tablet, a lap top, or combinations thereof.

* * * * *